US009826167B2

(12) United States Patent
Ito

(10) Patent No.: US 9,826,167 B2
(45) Date of Patent: Nov. 21, 2017

(54) IMAGING APPARATUS AND IMAGING METHOD WHICH PERFORM FOCUS ADJUSTMENT WHILE PERFORMING LIVE-VIEW DISPLAY

(71) Applicant: Olympus Corporation, Shibuya-ku, Tokyo (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/059,677

(22) Filed: Mar. 3, 2016

(65) Prior Publication Data

US 2016/0191805 A1    Jun. 30, 2016

Related U.S. Application Data

(63) Continuation of application No. 14/253,024, filed on Apr. 15, 2014, now Pat. No. 9,307,137.

(30) Foreign Application Priority Data

Apr. 16, 2013   (JP) ................................. 2013-085772

(51) Int. Cl.
*H04N 5/222* (2006.01)
*H04N 5/232* (2006.01)
*H04N 5/235* (2006.01)

(52) U.S. Cl.
CPC ....... *H04N 5/23293* (2013.01); *H04N 5/2351* (2013.01); *H04N 5/2352* (2013.01); *H04N 5/2353* (2013.01); *H04N 5/23212* (2013.01)

(58) Field of Classification Search
None
See application file for complete search history.

(56) References Cited

FOREIGN PATENT DOCUMENTS

JP    2009 164677    *    7/2009    ............. H04N 5/235

* cited by examiner

*Primary Examiner* — Stephen Coleman
(74) *Attorney, Agent, or Firm* — John C. Pokotylo; Pokotylo Patent Services

(57) ABSTRACT

An imaging apparatus performing live-view display by generating image data using an exposure parameter calculated from a brightness value in a photometric area for the live-view display which is different from a photometric area for focus adjustment when not performing the focus adjustment, the imaging apparatus comprising: a first calculating section for calculating a first brightness value in the photometric area for the live-view display; a second calculating section for calculating a second brightness value in the photometric area for focus adjustment; a comparison section for determining whether or not a brightness difference between the first brightness value and the second brightness value is within a predetermined range; and, an imaging section for obtaining image data by performing exposure using the first brightness value when the brightness difference between the first brightness value and the second brightness value is within the predetermined range.

9 Claims, 7 Drawing Sheets

IMAGING APPARATUS AND IMAGING METHOD WHICH PERFORM FOCUS ADJUSTMENT WHILE PERFORMING LIVE-VIEW DISPLAY

RELATED APPLICATIONS

This application is a continuation application of U.S. patent application Ser. No. 14/253,024 (referred to as "the '024 application" and incorporated herein by reference), filed on Apr. 15, 2014, titled "IMAGING APPARATUS AND IMAGING METHOD" and listing Satoru ITO as the inventor, the '024 application claiming benefit of Japanese Application No. 2013-085772 filed in Japan on Apr. 16, 2013, the contents of which are incorporated by this reference.

BACKGROUND OF THE INVENTION

1. Field of the Invention

The present invention relates to an imaging apparatus and an imaging method which perform focus adjustment while performing live-view display.

2. Description of Related Art

There has been known a camera which performs exposure by setting an exposure parameter (exposure time, aperture value, etc.) calculated based on brightness in a predetermined photometric area of a subject, when performing normal live-view display without performing focus adjustment (hereinafter, such exposure is called "LVAE"), and which performs the exposure for obtaining image data for the focus adjustment by selecting a photometric area for the focus adjustment (hereinafter, called "AFAE") and also uses the image data obtained based on this AFAE in parallel for the live-view display, when performing the live-view display together with focus adjustment. However, since generally a photometric range for the case of performing the focus adjustment is frequently narrower than the photometric range for the case of performing the normal live-view display, even for image data on the same subject area, between the image data for the focus adjustment and the image data for the normal live-view display, not only the level of the image data is different but also the brightness distribution mode of the image is frequently different because of saturation of the image data. Accordingly, the image quality of the live-view display changes between before and after the focus adjustment and a user feels uncomfortable.

Japanese Patent Laid-Open No. 2010-68046 (hereinafter, called "Patent Literature 1") solves a problem as described above by correcting the image data for the focus adjustment so as to cause the levels of the image data to become close to each other between the focus adjustment and the normal live-view display.

SUMMARY OF THE INVENTION

In Patent Literature 1, the level of the captured image data is different between before and after release operation, even for the same subject part. For example, when, although the image data obtained by performing LVAE for some subject area does not reach a saturation level, the image data obtained by performing AFAE for the same subject area reaches the saturation level, it is not possible to correct the image data obtained by AFAE into the image data having the same image quality as that of the image data obtained by LVAE. Accordingly, in such a case, even when the image data is corrected, the image quality of the live-view display still changes between before and after the focus adjustment, and thus the user feels uncomfortable.

The present invention has been achieved in view of such a situation, and aims to provide an imaging apparatus and an imaging method which perform the live-view display by generating the image data using the exposure parameter calculated from the brightness value of the photometric area for the live-view display which is different from the photometric area for the focus adjustment when not performing the focus adjustment, and also can perform the focus adjustment in a high accuracy while performing the live-view display in a preferable image quality despite whether the focus adjustment is being performed or not when performing the live-view display also during the focus adjustment.

An imaging apparatus according to the present invention is an imaging apparatus performing live-view display by generating image data using an exposure parameter calculated from a brightness value in a photometric area for the live-view display which is different from the photometric area for focus adjustment when not performing the focus adjustment, and performing the live-view display also when performing the focus adjustment, and includes: a focus adjustment brightness value calculation section comparing a first brightness value in the photometric area for the live-view display with a second brightness value in the photometric area for the focus adjustment, correcting the first brightness value according to a comparison result, and calculating a brightness value for obtaining the image data for the focus adjustment; an imaging section obtaining the image data by performing exposure using the brightness value calculated by the focus adjustment brightness value calculation section; a focus adjustment section performing the focus adjustment using the image data obtained by the imaging section; and a display section performing the live-view display using the image data obtained by the imaging section.

An imaging method according to the present invention is an imaging method performing live-view display by generating image data using an exposure parameter calculated from a brightness value in a photometric area for the live-view display which is different from the photometric area for focus adjustment when not performing the focus adjustment, and performing the live-view display also when performing the focus adjustment, and includes the steps of: comparing a first brightness value in the photometric area for the live-view display with a second brightness value in the photometric area for the focus adjustment, correcting the first brightness value according to a comparison result, and calculating a brightness value for obtaining the image data for the focus adjustment; obtaining the image data by performing exposure using the calculated brightness value; performing the focus adjustment using the obtained image data; and performing the live-view display using the obtained image data.

BRIEF DESCRIPTION OF THE DRAWINGS

FIGS. 6A to 6C show an example of photometric areas and a focus area in the whole imaging area according to Embodiments 1 to 3, in which FIG. 6A is a diagram showing the focus area, FIG. 6B is a diagram showing the photometric area for LVAE, and FIG. 6C is a diagram showing the photometric area including the focus area.

DETAILED DESCRIPTION OF THE PREFERRED EMBODIMENTS

Embodiment 1

Figure 1:
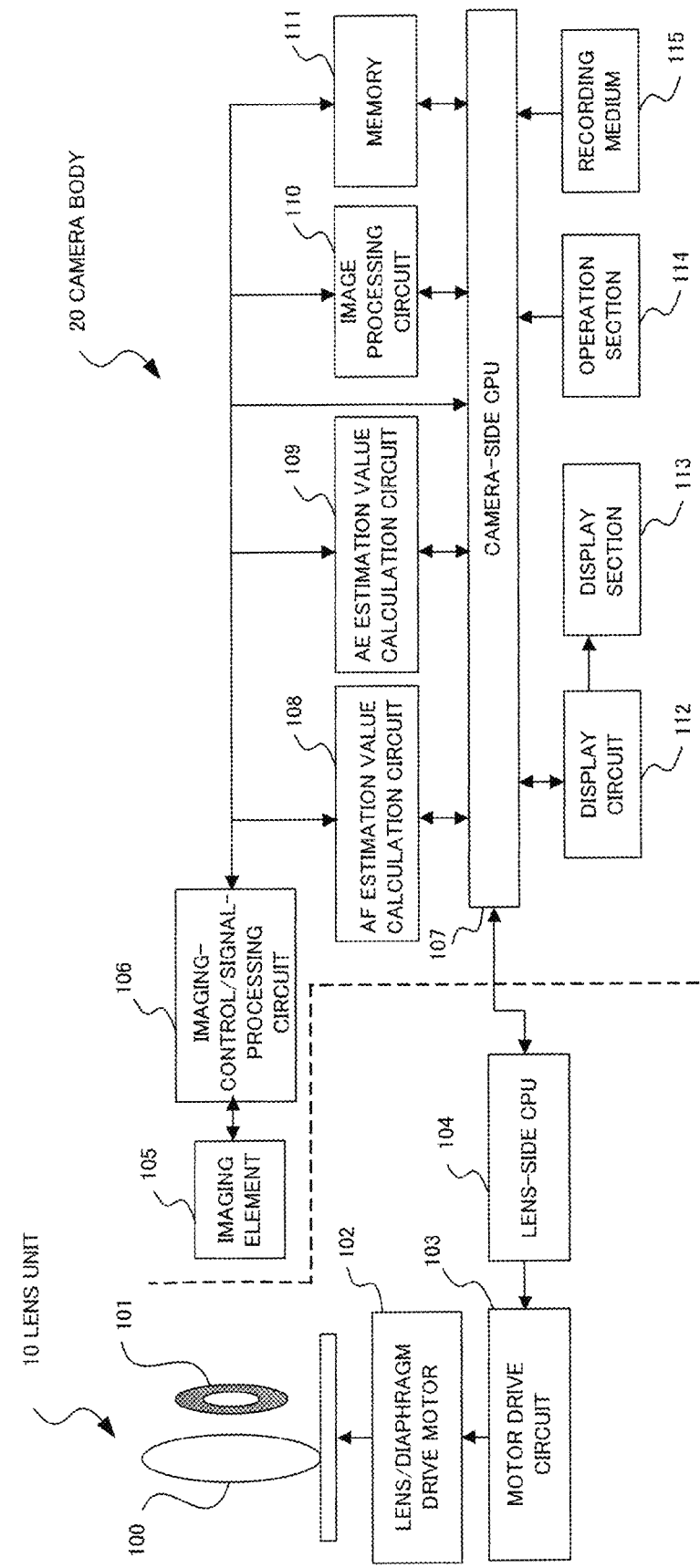
FIG. 1 is a block diagram mainly showing an electrical configuration of a camera according to Embodiments 1 to 3.

In the following, preferred Embodiment 1 will be explained by the use of a camera to which the present invention is applied. Note that, in the following explanation, explanation or detailed explanation will be omitted for the same operation and control technique as those of a typical imaging apparatus.

A camera according to Embodiment 1 is a digital camera, includes an imaging element 105, converts a subject image into image data in this imaging element 105, and displays the subject image on a display section in real time (hereinafter, called "live-view display") according to this converted image data. In photographing, a photographer selects an area where a subject is to be focused (hereinafter, called "focus area") and determines composition by observing the live-view display. When a release button included in an operation section 114 is half-pressed (hereinafter, called "1st release"), the focus of a photographic lens 100 is adjusted, and, when the release button is further pressed fully (hereinafter, called "2nd release"), photographing is performed. The image data obtained in the photographing is recorded into a memory 111 after having been subjected to predetermined image processing in an image processing circuit 110.

FIG. 1 is a block diagram mainly showing an electrical configuration of the camera according to Embodiment 1. The camera according to Embodiment 1, when broadly divided, includes a lens unit 10, and a camera body 20. The lens unit 10 includes the photographic lens 100, a diaphragm 101, a lens/diaphragm drive motor 102 for the driving thereof, a motor drive circuit 103, and a lens-side CPU 104. Further, the camera body 20 includes the imaging element 105, an imaging-control/signal-processing circuit 106, a camera-side CPU 107, an AF (Auto Focus) estimation value calculation circuit 108, an AE (Auto Exposure) estimation value calculation circuit 109, the image processing circuit 110, the memory 111, a display circuit 112, a display section 113, the operation section 114, and a recording medium 115.

The photographic lens 100 is configured with plural optical lenses for forming a subject image, and is a single focus lens or a zoom lens. The diaphragm 101 is disposed on an optical axis of the photographic lens 100 around an exit pupil of the photographic lens 100, and adjusts incident light intensity and focal depth. The diaphragm 101 and the photographic lens 100 are controlled by the camera-side CPU 107, the lens-side CPU 104, the motor drive circuit 103, and the motor 102, and focus adjustment and aperture adjustment are realized. Here, the lens-side CPU 104 interprets a control command received from the camera-side CPU 107 to be described below, and controls the lens 100 and the diaphragm 101.

The imaging element 105 is disposed on the optical axis of the photographic lens 100, and performs the imaging of a subject image formed by the photographic lens 100. This imaging element 105 is configured with pixels which include photodiodes and are arranged in a two-dimensional matrix, and stores electric charge according to received light intensity. Electric charge storage control, image signal read-out control, and the like of the imaging element 105 are performed by the imaging-control/signal-processing circuit 106 connected to the output of the imaging element 105. The image data read out from this imaging element 105 is output to the camera-side CPU 107, the AF estimation value calculation circuit 108, the AE estimation value calculation circuit 109, the image processing circuit 110, and the memory 111.

The AF estimation value calculation circuit 108 detects a focusing state of a subject using a high-frequency component of the image data output from the imaging element 105. This AF estimation value calculation circuit 108 is used also as a focus adjustment section. The AE estimation value calculation circuit 109 calculates a brightness value when the focus adjustment image data is obtained, by correcting a brightness value of the photometric area when the live-view image data is obtained, and calculates an exposure time (Tv) and an aperture value (Av) for obtaining appropriate exposure in the live-view display and in the focus adjustment. This AE estimation value calculation circuit 109 is used also as a focus adjustment brightness value calculation section. The image processing circuit 110 performs various kinds of image processing such as synchronization processing, gradation conversion processing, white balance adjustment, edge processing, for the image data readout from the imaging element 105. The image data subjected to the image processing is recorded into the recording medium 115 mounted on the camera body 20 detachably.

When the user operates the operation section 114 connected to the camera-side CPU 107, the AF estimation value calculation circuit 108, the AE estimation value calculation circuit 109, the image processing circuit 110, and the memory 111 are controlled by the camera-side CPU 107, and the focus adjustment, the exposure control, the image processing, and the like are performed as basic operations of the camera. At this time, in operation accompanying the control of the lens and the diaphragm such as AF and AE, the camera-side CPU 107 transmits a control command to the lens-side CPU 104 according to a control program stored in the memory 111, using output values of the AF estimation value calculation circuit 108 and the AE estimation value calculation circuit 109. Further, the camera-side CPU 107 displays a live-view image expressed by the display image data generated in the image processing circuit 110, on the display section 113 via the display circuit 112.

Next, a specific operation flow of the present invention using the above described electrical configuration will be explained with reference to flowcharts in FIG. 2 to FIG. 5. Note that, in the explanation of the following operation, each of the operations is performed by the camera-side CPU 107 as far as not mentioned otherwise in particular.

Figure 2:
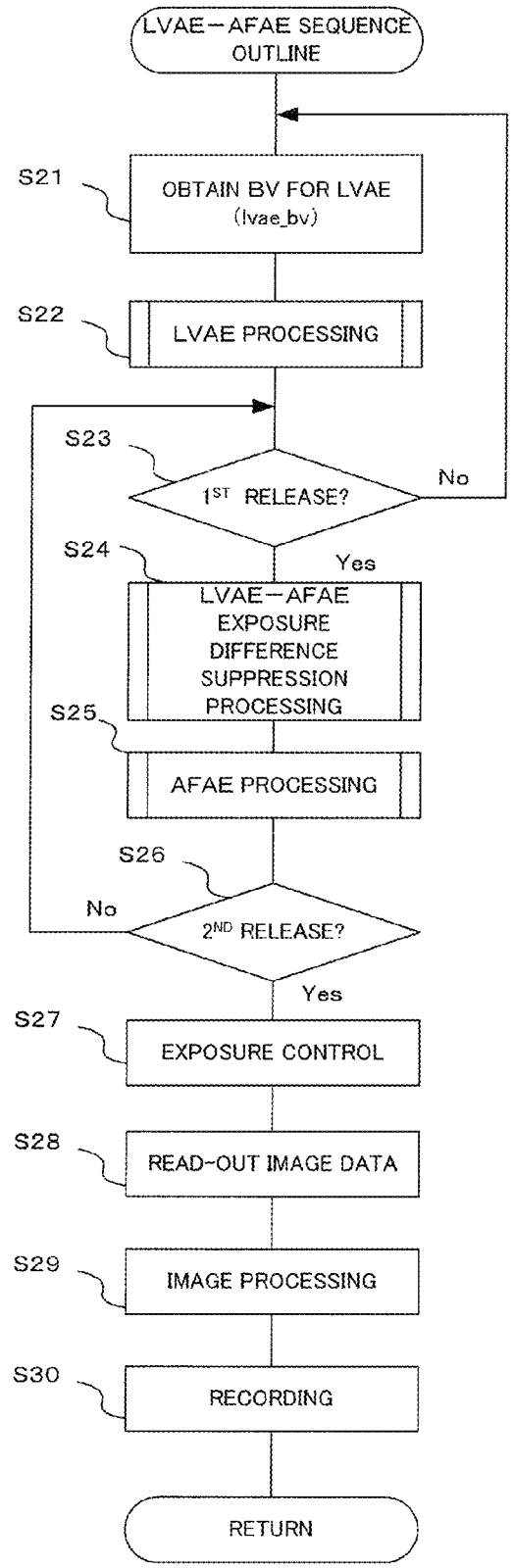
FIG. 2 is a flowchart showing an operation flow of camera control according to Embodiment 1 to 3.

FIG. 2 is a flowchart showing an operation flow of the camera control according to Embodiment 1. First, in step S21, the camera-side CPU 107 obtains By for LVAE (Brightness value) (variable name: lvae_bv) which is a brightness value of a photometric area for the normal live-view display without the focus adjustment. This lvae_bv is calculated in the AE estimation value calculation circuit 109 by so-called apex calculation based on an average level of the image data of the LVAE photometric area in the image data obtained by the imaging of the imaging element 105.

Figure 6A:
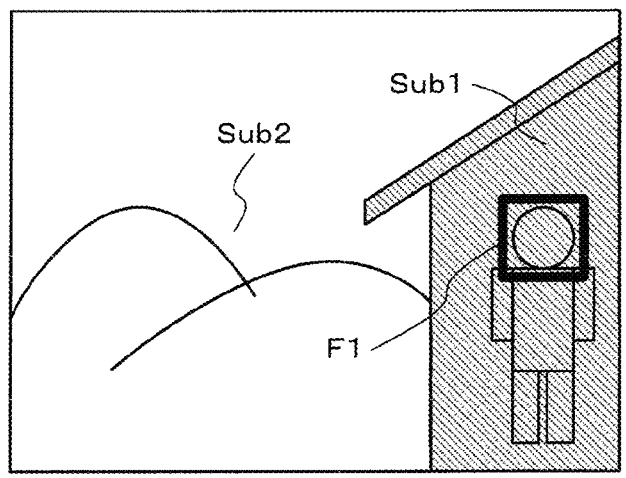

At this time, a scene as shown in FIG. 6A is assumed. In an example shown in FIG. 6A, a house Sub1 (part provided with hatching) on the right side of a screen has a low brightness because of a shadow area, and a background Sub2 including mountains has a high brightness because of the sunshine. The main subject is a person and a focus area F1 is set at a face part.

Figure 6B:
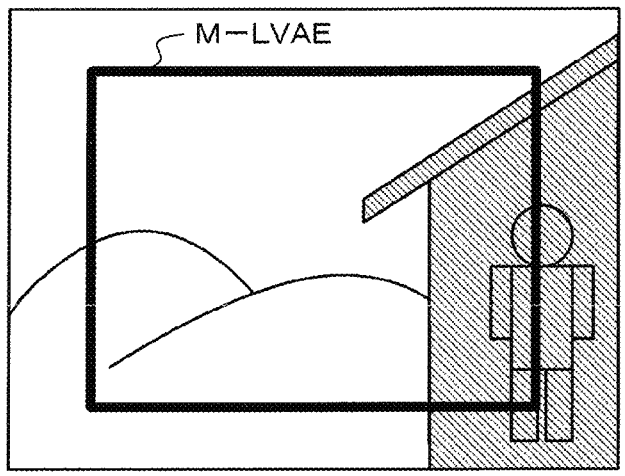

FIG. 6B shows the LVAE photometric area M-LVAE in the live-view display, and this area is set across a wide range as shown in FIG. 6B. Since most of the LVAE photometric area M-LVAE has a high brightness in the scene shown in FIG. 6B, lvae_bv has a large value. LVAE processing is performed using this lvae_bv in step S22. This LVAE processing performs appropriate exposure control for live-view by calculating and setting an exposure condition using lvae_bv.

Figure 3:
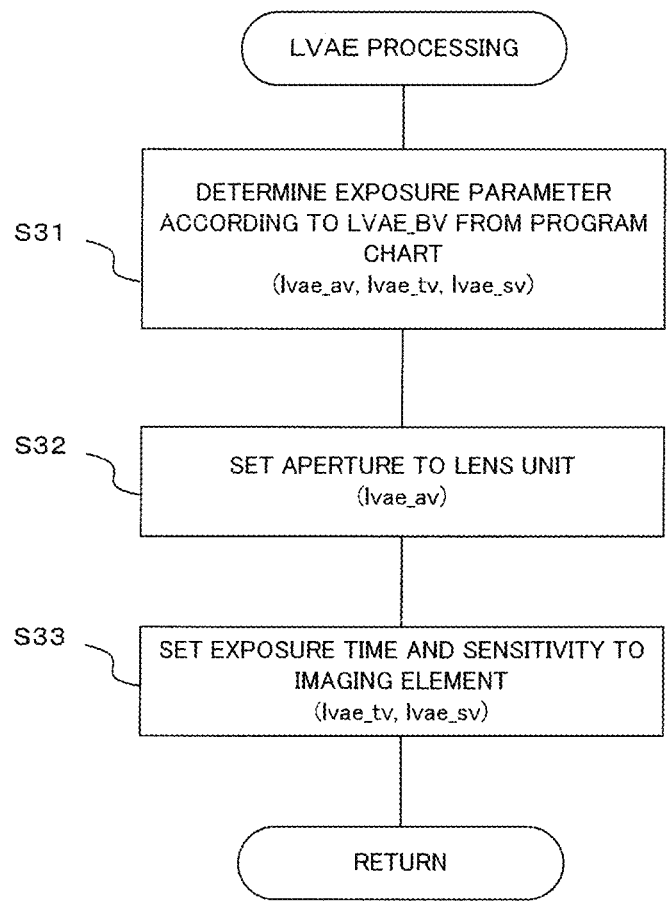
FIG. 3 is a subroutine showing a flow of LVAE processing of a camera according to Embodiments 1 to 3.

Next, the LVAE processing in step S22 will be explained in detail with reference to a subroutine in FIG. 3. This LVAE processing is executed by a cooperative operation of the AE estimation value calculation circuit 109 and the camera-side CPU 107. Step S31 determines Av, Tv, and Sv for LVAE (respective variable names: lvae_av, lvae_tv, and lvae_sv) which are derived from a program chart (not shown in the drawing) using lvae_bv obtained in step S21.

In step S32, a diaphragm control instruction to cause the diaphragm 101 to provide the value of lvae_av is transmitted from the camera-side CPU 107 to the lens-side CPU 104. Similarly, in step S33, an imaging element control instruction to cause the imaging element 105 to have an exposure time and a sensitivity of lvae_tv and lvae_sv, respectively, is transmitted from the camera-side CPU 107 to the imaging-control/signal-processing circuit 106. The exposure suitable for LVAE is performed by these instructions. After the LVAE processing is finished, the flow returns from the subroutine of FIG. 3.

Next, in step S23 of FIG. 2, it is determined whether the 1st release operation has been performed or not. When it is determined that the 1st release operation has been performed, the flow goes to processing after the 1st release operation in step S24.

Figure 6C:
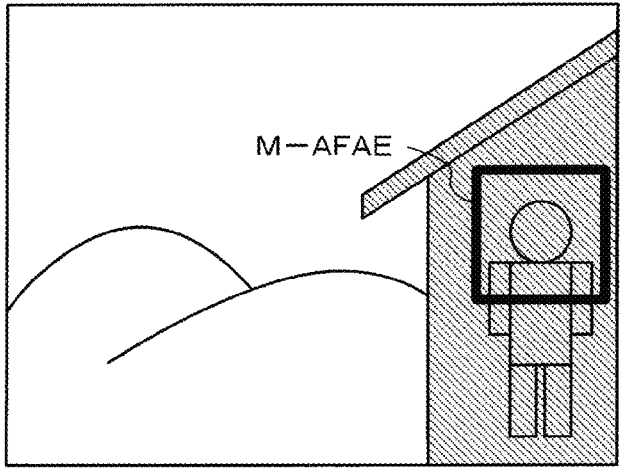

Generally, the photometric area for AFAE is different from the photometric area for LVAE. For example, compared with the LVAE photometric area M-LVAE shown in FIG. 6B, the AFAE photometric area M-AFAE which is the photometric area around the focus area shown in FIG. 6C is different in a position and an area size of the photometric area. Accordingly, when the LVAE processing for performing the live-view display is executed using By (variable name: afae_bv) which is a brightness value for AFAE, the image quality of the live-view display is degraded when AF processing is performed. In particular, the image quality of the live-view display changes between before and after the 1st release operation and a user feels uncomfortable. Accordingly, in Embodiment 1, when it is determined that the 1st release operation has been performed, LVAE-AFAE exposure difference suppression processing is performed as described in the following, in step S24.

Figure 4:
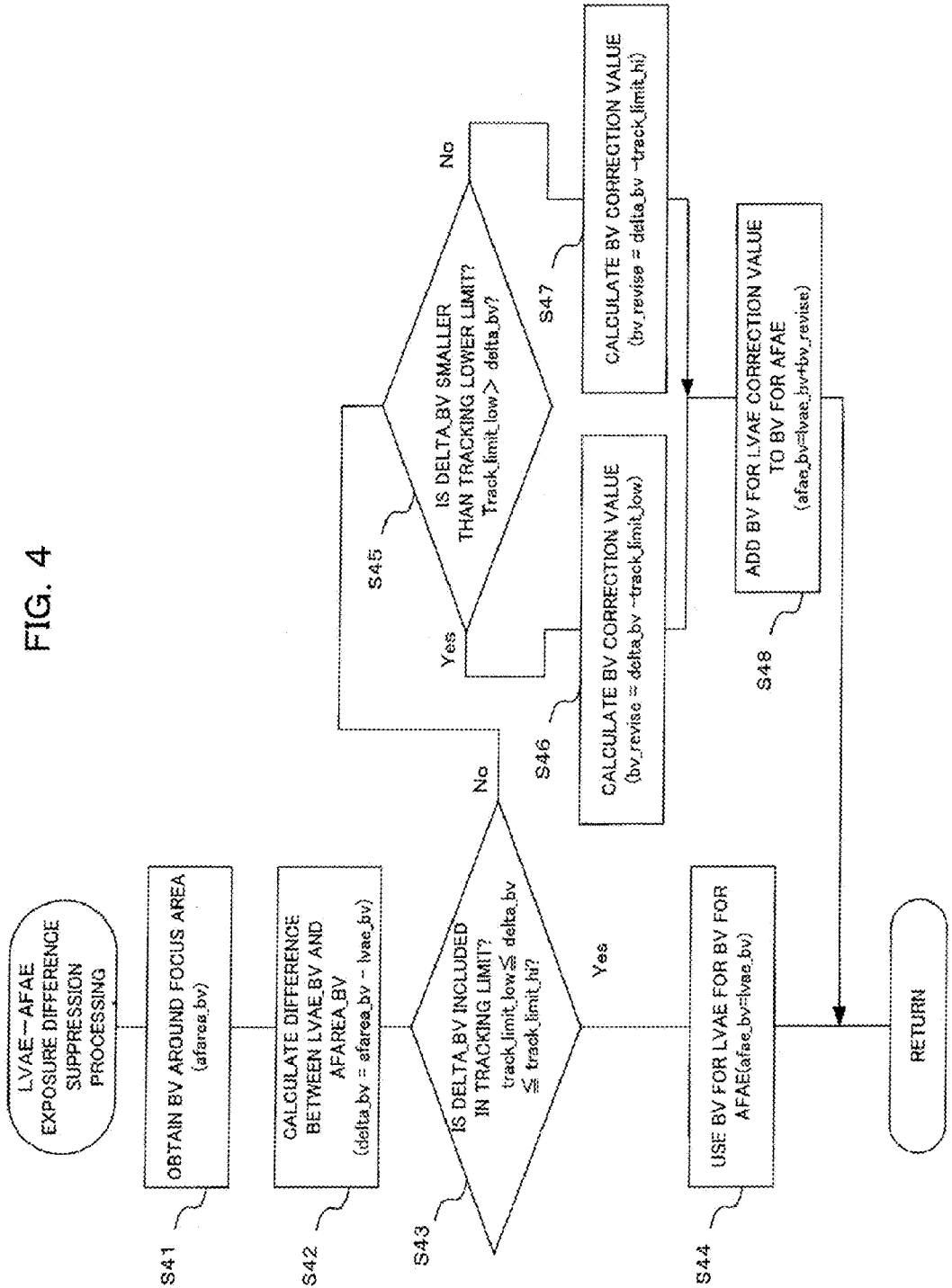
FIG. 4 is a subroutine showing a flow of LVAE-AFAE exposure difference suppression processing in a camera according to Embodiment 1.
Figure 5:
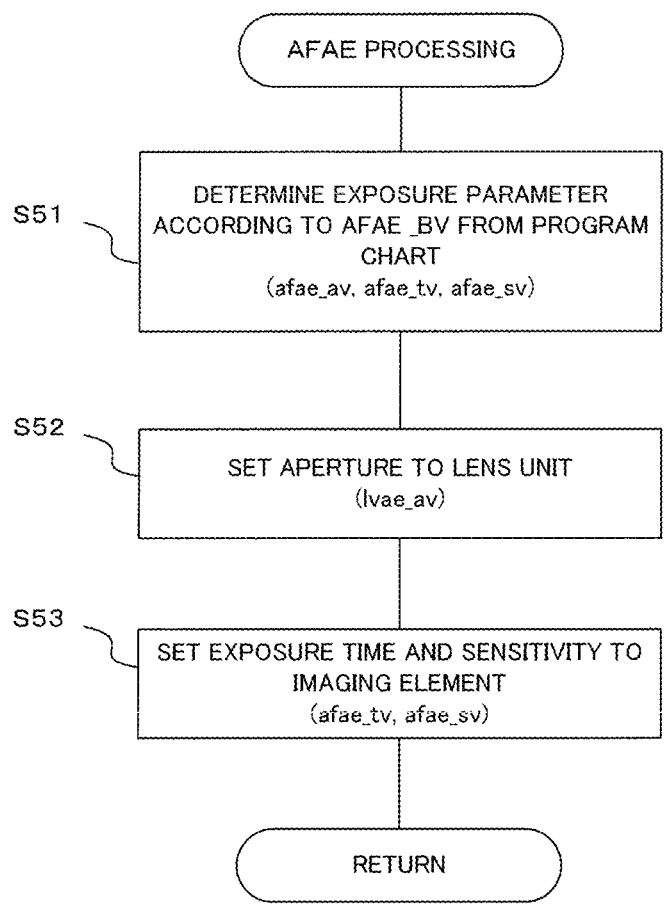
FIG. 5 is a subroutine showing a flow of AFAE processing of a camera according to Embodiments 1 to 3.

Next, with reference to FIG. 4, a flow of the LVAE-AFAE exposure difference suppression processing will be explained in detail. Here, this LVAE-AFAE exposure difference suppression processing is executed by a cooperative operation of the AE estimation value calculation circuit 109 as a brightness value correction section and the camera-side CPU 107.

In step S41, the camera-side CPU 107 obtains By (afarea_bv) which is a brightness value in the AF photometric area around the focus area. Next, in step S42, a difference between afarea_bv and lvae_bv (afarea_bv–lvae_bv) is calculated to give delta_bv. Next, in step S43, it is determined whether or not track_limit_low≤delta_bv≤track_limit_hi holds. That is, it is determined whether or not delta_bv is included in a tracking region (upper limit variable: track_limit_hi and lower limit variable: track_limit_low).

This tracking region is a range of delta_bv in which an AF accuracy can be secured even if lvae_bv is used as By (variable name: afae_bv) which is a brightness value for AFAE. When delta_bv is included in this tracking region, after afae_bv of By for AFAE has been replaced by lvae_bv in step S44, the flow returns from the LVAE-AFAE exposure difference suppression processing subroutine.

That is, for the case that delta_bv is included in the tracking region, AFAE after the LVAE-AFAE exposure difference suppression processing becomes the same as LVAE. Accordingly, in the case that delta_bv is included in the tracking area, the image quality of the live-view display does not change between before and after the 1st release operation is performed. Further, the AF accuracy is also guaranteed.

On the other side, in the case that delta_bv is not included in the tracking region, if afae_bv=lvae_bv, there is a possibility that the AF accuracy cannot be secured. Accordingly, in the case that delta_bv is not included in the tracking region, a value of lvae_bv to which a By correction value (variable name: bv_revise) is added as a tracking region excess amount, is used for afae_bv.

First, in step S45, it is determined whether or not track_limit_low>delta_bv holds. For the case of track_limit_low>delta_bv as the result of this determination, next, in step S46, when the By correction value is expressed by bv_revise, it is determined that bv_revise=delta_bv–track_limit_low. On the other side, when it is not determined in step S45 that track_limit_low>delta_bv, it is determined in step S47 that bv_revise=delta_bv–track_limit_hi.

After processing of step S46 or step S47 is finished, next, in step S48, the By correction value calculated in step S46 or step S47 is added to By for LVAE to give afae_bv. After the calculation of afae_bv=lvae_bv+bv_revise is performed in step S48, the flow returns from the subroutine of the LVAE-AFAE exposure difference suppression processing.

In this manner, the LVAE-AFAE exposure difference suppression processing (processing of a focus adjustment brightness value calculation section) in the present embodiment calculates the brightness value (afae_bv) for obtaining image data for the focus adjustment by adding the correction value (bv_revise) to a first brightness value (lvae_bv) of the photometric area for the live-view display, and sets the correction value to zero when the brightness difference between the first brightness value and a second brightness value of the photometric area for the focus adjustment is not larger than a predetermined value and increases the correction value as the brightness difference becomes larger when the brightness difference is larger than the predetermined value.

Figure 7:
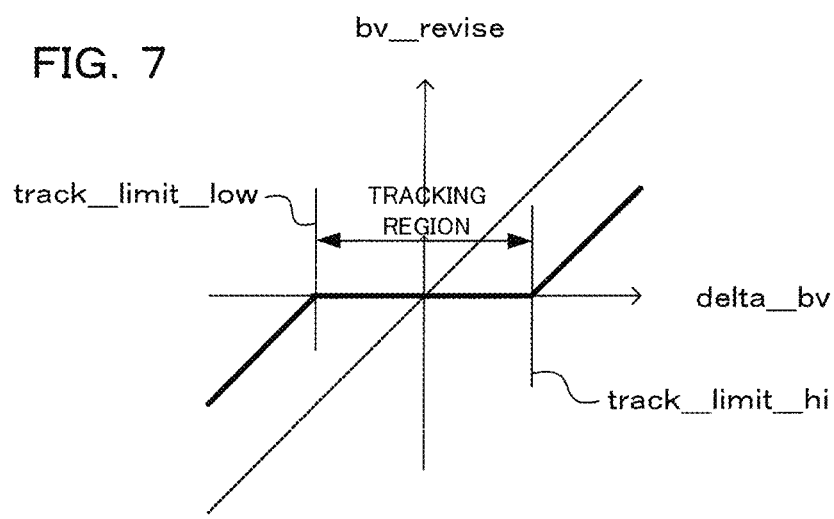
FIG. 7 is a graph showing a relationship between a difference of the brightness of a focus adjustment photometric area from the brightness of a live-view display photometric area (delta_bv) and a correction value for correcting the brightness value of the live-view display photometric area to calculate a brightness value for performing focus adjustment (bv_revise), in Embodiment 1.

FIG. 7 is a graph showing a relationship between the above described delta_bv and bv_revise. In FIG. 7, the horizontal axis shows the difference value (delta_bv) between the first brightness value (lvae_bv) for the live-view display and the second brightness value of the photometric area for the focus adjustment, and the vertical axis shows the correction value (bv_revise). As apparent from FIG. 7, when the difference value (delta_bv) between the first brightness value (lvae_bv) of the photometric area M-LVAE for the live-view display and the second brightness value of the photometric area for the focus adjustment is included in the tracking region (track_limit_low to track_limit_hi), the correction value (bv_revise) is zero, and, when the difference value (delta_bv) between the first brightness value (lvae_bv) and the second brightness value is not included in the tracking region (smaller than track_limit_low or larger than track_limit_hi), the correction value is determined according to the brightness difference.

In this manner, according to the present embodiment, it is possible to provide an imaging apparatus and an imaging method which can perform the focus adjustment in a high accuracy while performing the live-view display in a preferable image quality despite whether the focus adjustment is being performed or not.

After the LVAE-AFAE exposure difference suppression processing is finished, next, AFAE processing is performed in step S25 of FIG. 2. Next, this AFAE processing will be explained in detail with reference to FIG. 5.

First, in step S51, Av, Tv and Sv for AFAE (respective variable names: afae_av, afae_tv, and afae_sv) derived from a program chart common to LVAE and AFAE are determined using Bv for AFAE (variable name: afae_bv) obtained in step S24. The above processing is executed by the AE estimation value calculation circuit 109 and the camera-side CPU 107. Next, in step S52, the camera-side CPU 107 transmits the diaphragm control instruction corresponding to afae_av to the lens-side CPU 104. Next, in step S53, the camera-side CPU 107 transmits the imaging element control instructions corresponding to afae_tv and afae_sv to the imaging-control/signal-processing circuit 106.

After the AFAE processing is finished, next, in step S26 of FIG. 2, it is determined whether the 2nd release operation has been performed or not. When the 2nd release operation has not been performed, the flow returns to step S23 and the above described processing is performed repeatedly. When it is determined in step S26 that the 2nd release operation has been performed, next, in step S27, the exposure control is performed using the exposure parameters Av, Tv, and Sv calculated in the above described LVAE processing. This exposure control is executed under a cooperative operation of the camera-side CPU 107, the imaging-control/signal-processing circuit 106, the diaphragm 101, the imaging element 105 and the like. After the exposure control is finished, next, the image data is read out from the imaging element 105 and a predetermined image processing is performed in the imaging-control/signal-processing circuit 106, and the image processing circuit 110. Next, in step S30, the image data is recorded into the recording medium 115.

Embodiment 2

Embodiment 2 is different from Embodiment 1 only in the LVAE-AFAE exposure difference suppression processing of step S24 in FIG. 2. The other configuration and processing are the same as those in Embodiment 1, and only the different point will be explained in the following explanation.

Figure 8:
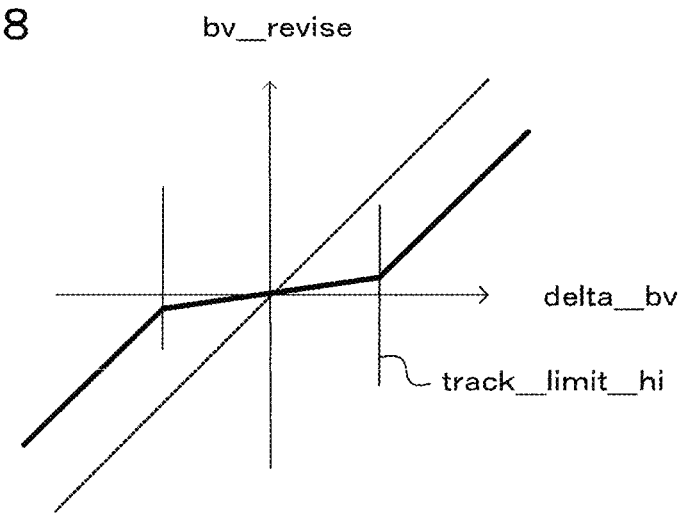
FIG. 8 is a graph showing a relationship between a difference of the brightness of a focus adjustment photometric area from the brightness of a live-view display photometric area (delta_bv) and a correction value correcting the brightness value of the live-view display photometric area to calculate a brightness value for performing focus adjustment (bv_revise), in Embodiment 2.

FIG. 8 shows a relationship between the difference of the brightness of the focus adjustment photometric area from the brightness of the live-view display photometric area (delta_bv), and the correction value for correcting the brightness value of the live-view display photometric area to calculate the brightness value for performing the focus adjustment (bv_revise), in the present embodiment.

In the present embodiment, bv_revise is increased as the absolute value of delta_bv becomes larger when delta_bv is included in the range from the lower limit value track_limit_low to the upper limit value track_limit_hi. That is, lvae_bv is corrected and afae_bv is calculated so as to cause the difference between lvae_bv and afae_bv to be increased as the absolute value of delta_bv becomes larger. On the other side, when delta_bv is not included in the range from the lower limit value track_limit_low to the upper limit value track_limit_hi, as shown in FIG. 8, it is configured such that the straight line bv_revise of the vertical axis is inclined to delta_bv of the horizontal axis by 45 degrees. This means that bv_revise has a value obtained by subtracting a constant value from delta_bv. The above processing is executed by a cooperative operation of the AE estimation value calculation circuit 109 as the brightness value correction section and the camera-side CPU 107.

In the present embodiment, when delta_bv is included in the range from the lower limit value track_limit_low to the upper limit value track_limit_hi, bv_revise is increased as the absolute value of delta_bv becomes larger. Accordingly, compared with Embodiment 1, it is possible to adjust the balance between the accuracy of the focus adjustment and the image quality of the live-view display more delicately.

Embodiment 3

Embodiment 3 is different from Embodiment 1 only in the LVAE-AFAE exposure difference suppression processing of step S24 in FIG. 2. The other configuration and processing are the same as those of Embodiment 1, and only the different point will be explained in the following explanation.

Figure 9:
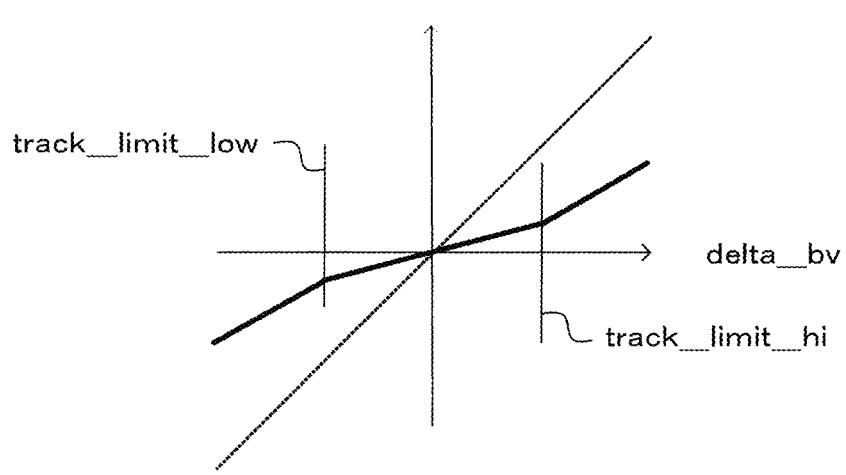
FIG. 9 is a graph showing a relationship between a difference of the brightness of a focus adjustment photometric area from the brightness of a live-view display photometric area (delta_bv) and a correction value correcting the brightness value of the live-view display photometric area to calculate a brightness value for performing focus adjustment (bv_revise), in Embodiment 3.

FIG. 9 shows a relationship between the difference of the brightness of the focus adjustment photometric area from the brightness of the live-view display photometric area (delta_bv), and the correction value for correcting the brightness value of the live-view display photometric area to calculate the brightness value for performing the focus adjustment (bv_revise), in the present embodiment.

In the present embodiment, when delta_bv is included in the range from the lower limit value track_limit_low to the upper limit value track_limit_hi, as the absolute value of delta_bv becomes larger, lvae_bv is corrected and afae_bv is calculated so as to cause the difference between lvae_bv and afae_bv to be increased. On the other side, when delta_bv is not included in the range from the lower limit value track_limit_low to the upper limit value track_limit_hi, the slope of a straight line showing a relationship between delta_bv and bv_revise is increased slightly from the slope of the straight line when delta_bv is included in the range from track_limit_low to track_limit_hi. This means that lvae_bv is corrected and afae_bv is calculated so as to cause the difference between lvae_bv and afae_bv to be always increased as the absolute value of delta_bv becomes larger, in the present embodiment. The above processing is executed by a cooperative operation of the AE estimation value calculation circuit 109 as the brightness value correction section and the camera-side CPU 107.

In this manner, in the LVAE-AFAE exposure difference suppression processing (processing of focus adjustment brightness value calculation section) in the present embodiment, the focus adjustment brightness value calculation section calculates the brightness value (afae_bv) for obtaining the image data for the focus adjustment by adding the correction value (bv_revise) to the first brightness value (lvae_bv) of the live-view display photometric area, and increases the correction value as the brightness difference between the above described first brightness value (afae_bv) and the second brightness value of the focus adjustment photometric area (afarea_bv) becomes larger.

According to the present embodiment, compared with Embodiments 1 and 2, it becomes possible to adjust the balance between the accuracy of the focus adjustment and the image quality of the live-view display more delicately.

The present invention is not limited to the above described embodiments, and can be also realized by modification of the constituents in a range without departing from the gist thereof in the stage of implementation. For example, while, in Embodiment 1, the live-view display is performed based on the image obtained using LVAE before the release operation and the focus adjustment and also the live-view display are performed based on the image data obtained using AFAE after the release operation, the release operation is not necessarily essential. That is, the case that the AF control is performed while the live-view display is being performed is also included in the scope of the present invention. Further, by an appropriate combination of the plural constituents disclosed in the above described embodiments, various inventions can be formed. Further, the constituents across the different embodiments may be combined appropriately. In this manner, various modifications and applications are possible in a range without departing from the gist of the invention.

What is claimed is:

1. An imaging apparatus performing live-view display by generating image data using an exposure parameter calculated from a brightness value in a photometric area for the live-view display which is different from a photometric area for focus adjustment when not performing the focus adjustment, and performing the live-view display also when performing the focus adjustment, the imaging apparatus comprising:
   an auto-exposure (AE) value calculation circuit configured to calculate a first brightness value in the photometric area for the live-view display and a second brightness value in the photometric area for focus adjustment;
   a processor for determining whether or not a brightness difference between the first brightness value and the second brightness value is within a predetermined range;
   an image sensor for obtaining image data by performing exposure using the first brightness value when the brightness difference between the first brightness value and the second brightness value is within the predetermined range;
   a focus adjustment section performing the focus adjustment using the image data obtained by the image sensor; and
   a display configured to perform the live-view display using the image data obtained by the image sensor.

2. The imaging apparatus according to claim 1, wherein the predetermined range corresponds to a range capable of securing accuracy of the focus adjustment even though performing exposure using the first brightness value.

3. An imaging method performing live-view display by generating image data using an exposure parameter calculated from a brightness value in a photometric area for the live-view display which is different from a photometric area for focus adjustment when not performing the focus adjustment, and performing the live-view display also when performing the focus adjustment, the imaging method comprising the steps of:
   a first step of calculating a first brightness value in the photometric area for the live-view display;
   a second step of calculating a second brightness value in the photometric area for focus adjustment;
   a third step of comparing a brightness difference between the first brightness value and the second brightness value with a specified value;
   a fourth step of obtaining image data by performing exposure using the first brightness value responsive to a determination that the brightness difference between the first brightness value and the second brightness value is within a predetermined range;
   a fifth step of performing the focus adjustment using the image data obtained in the fourth step; and
   a sixth step of performing the live-view display using the image data obtained in the fifth step.

4. The imaging method of claim 3 wherein the predetermined range corresponds to a range capable of securing accuracy of the focus adjustment even though performing exposure using the first brightness value.

5. An imaging method comprising:
   calculating a first brightness value of the photometric area for live-view display;
   calculating a second brightness value in the photometric area for focus adjustment, wherein the photometric area for focus adjustment is different from the photometric area for live-view display;
   calculating a brightness difference between the first brightness value and the second brightness;
   determining whether or not the brightness difference is within a predetermined range;
   responsive to a determination that the brightness difference is within the predetermined range, performing exposure using a first function of the first brightness value, and otherwise, responsive to a determination that the brightness difference is not within the predetermined range, performing exposure using a second function of the first brightness value, wherein the second function is different from the first function;
   performing the focus adjustment using image data obtained by the performed exposure; and
   performing the live-view display while performing the focus adjustment.

6. The imaging method of claim 5 wherein performing exposure using the first function of the first brightness value includes (1) determining a first adjustment amount that increases as an absolute value of the brightness difference becomes larger, (2) applying the first adjustment amount to the first brightness value to obtain a first adjusted first brightness value, and (3) performing exposure using the first adjusted first brightness value, and wherein performing exposure using the second function of the first brightness value includes (1) determining a second adjustment amount by subtracting a constant value from the brightness difference, (2) applying the second adjustment amount to the first brightness value to obtain a second adjusted first brightness value, and (3) performing exposure using the second adjusted first brightness value.

7. The imaging method of claim 5 wherein performing exposure using the first function of the first brightness value includes (1) determining a first adjustment amount that increases as an absolute value of the brightness difference becomes larger, (2) applying the first adjustment amount to the first brightness value to obtain a first adjusted first brightness value, and (3) performing exposure using the first adjusted first brightness value, and wherein performing exposure using the second function of the first brightness value includes (1) determining a second adjustment amount that increases, by an amount greater than the first adjustment amount, as an absolute value of the brightness difference becomes larger, (2) applying the second brightness value adjustment amount to the first brightness value to obtain a second adjusted first brightness value, and (3) performing exposure using the second adjusted first brightness value.

8. The imaging method of claim 5 wherein performing exposure using the first function of the first brightness value performs exposure using the first brightness value without change, and wherein performing exposure using the second function of the first brightness value includes (1) determining a brightness value adjustment amount as a function of the brightness difference, (2) applying the brightness value adjustment amount to the first brightness value to obtain an adjusted first brightness value, and (3) performing exposure using the adjusted first brightness value.

9. The imaging method of claim 8 wherein the brightness value adjustment amount is determined using both (i) the brightness difference, and (ii) either (A) an upper limit of the predetermined range, or (B) a lower limit of the predetermined range.

* * * * *